Figure 1:
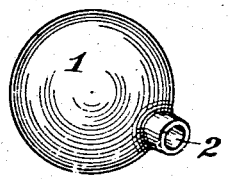

No. 768,943. PATENTED AUG. 30, 1904.
I. F. KEPLER.
HOLLOW RUBBER BULB, BALL, OR ANALOGOUS ARTICLE.
APPLICATION FILED AUG. 31, 1903.
NO MODEL.

WITNESSES:
INVENTOR
ATTORNEY

No. 768,943. Patented August 30, 1904.

UNITED STATES PATENT OFFICE.

IRWIN FLOYD KEPLER, OF AKRON, OHIO, ASSIGNOR TO THE B. F. GOODRICH COMPANY, OF OHIO, AKRON, OHIO, A CORPORATION OF OHIO.

HOLLOW RUBBER BULB, BALL, OR ANALOGOUS ARTICLE.

SPECIFICATION forming part of Letters Patent No. 768,943, dated August 30, 1904.

Application filed August 31, 1903. Serial No. 171,378. (No model.)

*To all whom it may concern:*

Be it known that I, IRWIN FLOYD KEPLER, a citizen of the United States of America, and a resident of the city of Akron, county of Summit, and State of Ohio, have invented certain new and useful Improvements in Hollow Rubber Bulbs, Balls, or Analogous Articles, of which the following is a specification.

This invention relates to hollow rubber bulbs, balls, or analogous articles, and has for its object to provide a rubber bulb, ball, or like article which can be made practically without handwork and at comparatively low cost by simple machinery easily operated by less skilled and cheaper labor than that required to run sheet-rubber calendering-machines, the use of which is dispensed with in producing my improved bulbs or other rubber articles which are less expensive than such articles as ordinarily made and are stronger and more durable and efficient in use.

The invention will first be described and then will be particularly defined in claims hereinafter set forth.

I attain these objects, primarily, by the use of tubing formed from uncured-rubber stock properly macerated to uniform consistency, and, secondarily, by the use of suitable cutting and pressing dies to cut and press a double-walled edge-joined blank from such tubing.

In forming a hollow rubber article it has heretofore been the practice to cut from sheet-rubber suitable blanks for the article intended to be produced, to place these blanks together, first dusting their adjacent faces with powdered soapstone or similar material to prevent adhesion, and then to edge-join these blanks by handwork after inserting a capsule of vapor-generating material or other medium for the production of gas or vapor during vulcanization and then to inject air into the article so formed by means of a hollow needle with which the blank is pierced and to close the hole made by the needle with gum or cement. This inflation is necessary to produce a bulb that will withstand the temperature of vulcanization in the vulcanizing-mold, since without such separation the walls will adhere in spite of their pulverulent coating before the heat reaches a temperature sufficient to liberate the gas from the contained capsule or produce vapor. In my improved article no piercing of the walls of the blank is necessary, and the necessity for patching is dispensed with, since the tubing itself contains air, and when a section of it is sheared off by the cutting edges of the dies the contained air is confined therein, and the walls of the blank are thus distended without additional inflation. The air-bags of uncured stock thus formed merely by shearing the tubing are further distended by the immediately-following action of the pressing-die, which in uniting the marginal areas tends to confine the air in more limited space, and thus increases the distention of the bag, ball, or bulb.

Reference is made to the accompanying drawings, forming part of this specification, and in which—

Figure 2:
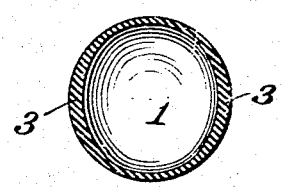
Figure 3:
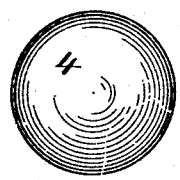
Figure 4:
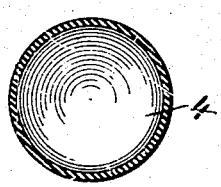
Figure 5:
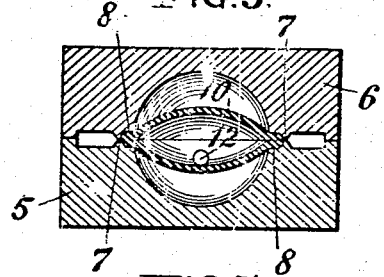
Figure 7:
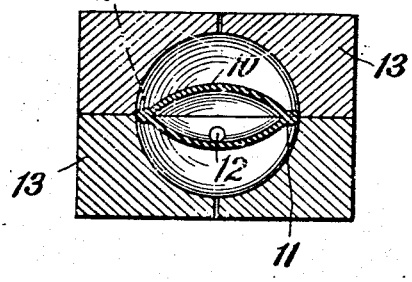
Figure 8:
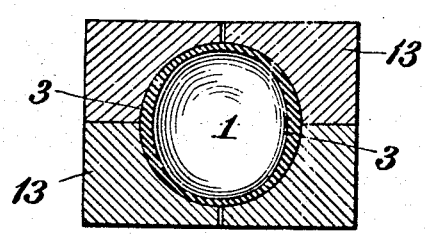
Figure 9:
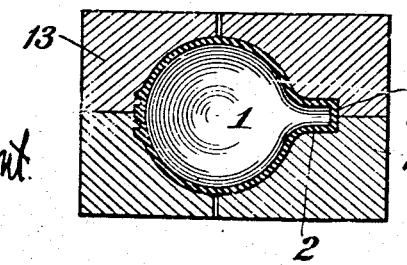

Figure 1 is a perspective view of a necked bulb embodying my invention, and Fig. 2 is a transverse section of the bulb. Fig. 3 is a side view of a round rubber ball embodying the invention, and Fig. 4 is a transverse section of said ball. Fig. 5 is a cross-section, and Fig. 6 a longitudinal section, showing the cutting-die and the uncured bulb-blank formed thereby and containing a gas or vapor generating substance. Figs. 7 and 8 are cross-sections of the mold in which the uncured die-shaped bulb-blank is shown in Fig. 7 and the vulcanized bulb in Fig. 8, and Fig. 9 is a longitudinal section showing the vulcanized necked bulb in the mold.

As my improved bulb, ball, or analogous article is made from uncured-rubber tubing, it may be as well to state that uncured-rubber tubing is usually made from rubber compound or stock which has been properly macerated and mixed and then forced through the mandrel-dies of a tubing-machine, which produces a seamless rubber tube having substantially uniform molecular consistency throughout its walls.

My invention is not restricted to a hollow rubber bulb, ball, or like article made from such die-drawn tubing, as the rubber tubing may be produced in any approved manner, By using the preferred die-drawn tubing I am able to obtain a finished rubber bulb or ball having walls of uniform molecular consistency and great strength throughout and at a much reduced cost as compared with bulbs, balls, or analogous articles made by the usual process of cutting calendered sheet-rubber stock into segments and hand-joining these segments and inserting independently-formed green-rubber pieces to reinforce a neck or projection or thickened portion of the finished bulb or article prior to its vulcanization.

In the drawings, Fig. 1 shows a vulcanized rubber bulb 1, having a neck 2, adapted for connection with a pipe or other portion of an atomizer or other finished product with which the bulb is incorporated in use.

Fig. 2 of the drawings illustrates how the the wall of the bulb may be thickened at 3 during the process of manufacture.

Fig. 3 of the drawings shows a round rubber ball 4, and Fig. 4 shows that the ball-walls may have uniform thickness throughout.

Figure 6:
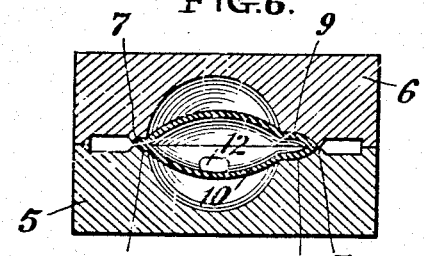

Figs. 5 to 9 of the drawings are introduced to illustrate steps in the process of making the improved bulb, ball, or other article from rubber tubing and in order to give a clearer idea of these improved bulb or ball products, the process itself being fully described and claimed in my prior and concurrent patent application having Serial No. 148,621 and of which this application is a division. Said Figs. 5 to 9 of the drawings more particularly show steps in the process of forming the necked bulb (shown in Figs. 1 and 2) and are briefly explained as follows:

The opposing similar sections 5 6 of the bulb-blank cutting or shaping die shown in Figs. 5 and 6 of the drawings have registering cutting edges 7, which surround recesses 8 9, so shaped that as the "cut-off" 7 shears the uncured bulb-blank 10 from a piece of rubber tubing the edges 11 of the opposing walls of the blank will be pressed into intimate or integral union by and within said die-recesses 8 9, the recesses 8 forming the integral margin of the blank all around, while the blank-neck body portion is formed by the recesses 9. Before thus cutting or shaping the bulb-blank 10 from uncured-rubber tubing a capsule 12, of suitable gas or vapor generating substance, is placed within the tubing to assure sealing of the said capsule within the formed blank. This blank then is placed within the vulcanizing-mold 13, as shown in Fig. 7 of the drawings, and during vulcanization the blank is formatively expanded to the mold-walls, as shown in Figs. 8 and 9 of the drawings, by outward pressure of gas or vapor arising from the decomposing capsule 12. After the vulcanized blank is taken from the cooled mold the closed extremity or end seal 14 of its neck is cut off, thus leaving the finished vulcanized necked bulb shown in Fig. 1 of the drawings. The increased wall thickness at 3 of the bulb is due to expansion of the edge-joined portions 11 of the blank to the mold-walls. Should such increased wall thickness not be desired—as, for instance, in making the rubber ball shown in Fig. 3 of the drawings—it may be avoided by narrowing the die-recesses 8 to produce narrower homogeneously-joined edgings 11 on the blank and cause the finished ball or other article to have walls of substantially uniform thickness throughout, as shown in Fig. 4 of the drawings.

It is obvious that a hollow rubber bulb, ball, or other article of any desired shape made as above described from uncured-rubber tubing (preferably die-drawn tubing) has practically uniform molecular quality throughout its walls and is stronger even if made from lower-grade stock than articles of like class formed from segments or sections of calendered sheet-rubber and having one or more lapped hand-made joints or seams liable to imperfections and requiring insertion of independently-formed plugs or pieces to make or reinforce a necked or projecting or thickened wall portion of the article. A further considerable saving is effected by obviating the usual hand-trimming of the bulbs, balls, or other articles to a final finish for the market, as my bulb or other article made as above described is marginally trimmed by the cutting or shaping die prior to vulcanization.

My improved bulbs, balls, or other hollow rubber articles thus may be produced in great variety as regards form and size and at a much reduced cost, while assuring their increased strength and better wearing qualities.

In explaining this generic invention I have illustrated a single-necked bulb cut or shaped from plain or unreinforced uncured-rubber tubing as distinguished from a necked or end-thickened hollow rubber bulb or article produced from uncured-rubber tubing provided with special reinforcement at places from which the necks, projections, or thickened wall portions of finished bulbs or other articles are formed and as fully described in my companion subsidiary patent application filed of even date herewith and having Serial No. 171,380.

I claim as my invention—

1. A vulcanized hollow rubber bulb, ball or analogous article made from uncured-rubber tubing, substantially as described.

2. A vulcanized hollow rubber bulb, ball or analogous article made from a double-walled edge-joined blank cut from uncured-rubber tubing, substantially as described.

3. A vulcanized hollow rubber bulb, ball or analogous article made from uncured die-drawn rubber tubing, substantially as described.

4. A vulcanized hollow rubber bulb, ball or analogous article made from a double-walled edge-joined blank cut from uncured die-drawn rubber tubing, substantially as described.

5. A vulcanized hollow-rubber bulb, ball or analogous article made from a double-walled edge-joined blank shaped from uncured-rubber tubing by pressure, substantially as described.

6. A vulcanized hollow rubber bulb, ball or analogous article made from a double-walled edge-joined blank shaped from uncured-rubber tubing by die-pressure, substantially as described.

7. A vulcanized hollow rubber bulb, ball or analogous article made from a double-walled edge-joined blank shaped from uncured die-drawn rubber tubing by pressure, substantially as described.

8. A vulcanized hollow rubber bulb, ball or analogous article made from a double-walled edge-joined blank shaped from uncured die-drawn rubber tubing by die-pressure, substantially as described.

IRWIN FLOYD KEPLER.

Witnesses:
HARRY A. BAUMAN,
WILLIAM A. MEANS.